US012282412B2

(12) United States Patent
    Huth et al.

(10) Patent No.: US 12,282,412 B2
(45) Date of Patent: Apr. 22, 2025

(54) COVERAGE-GUIDED FUZZING VIA DYNAMIC INSTRUMENTATION

(71) Applicant: Robert Bosch GmbH, Stuttgart (DE)

(72) Inventors: Christopher Huth, Heilbronn (DE); Marius Fischer, Stuttgart (DE); Max Camillo Eisele, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 211 days.

(21) Appl. No.: 18/052,237

(22) Filed: Nov. 3, 2022

(65) Prior Publication Data
    US 2023/0146443 A1    May 11, 2023

(30) Foreign Application Priority Data
    Nov. 9, 2021 (DE) ............... 10 2021 212 596.4

(51) Int. Cl.
    *G06F 11/3604* (2025.01)
    *G06F 11/34* (2006.01)
    *G06N 7/02* (2006.01)
(52) U.S. Cl.
    CPC ...... *G06F 11/3612* (2013.01); *G06F 11/3476* (2013.01); *G06N 7/023* (2013.01)
(58) Field of Classification Search
    CPC .. G06F 11/3612; G06F 11/3676; G06N 7/023
    See application file for complete search history.

(56) References Cited

U.S. PATENT DOCUMENTS

| 5,764,884 A * | 6/1998 | Van Fleet | G06F 11/3466 |
| | | | 714/E11.195 |
| 2012/0304010 A1* | 11/2012 | Opstad | G06F 11/3676 |
| | | | 714/34 |
| 2016/0350211 A1* | 12/2016 | Cecchetti | G06F 11/3696 |
| 2019/0294537 A1* | 9/2019 | Bond | G06F 11/3688 |

OTHER PUBLICATIONS

Huning Dai et al., "Configuration Fuzzing for Software Vulnerability Detection", [Online], pp. 525-530, [Retreived from Interent on Jul. 15, 2024], <https://ieeexplore.ieee.org/stamp/stamp.jsp?tp=&arnumber=5438043> (Year: 2010).*
Oh et al.,"OS-less Dynamic Binary Instrumentation for Embedded Firmware," 2015 IEEE Symposium in Low-Power and High-Speed Chips (COOL Chips XVIII) (2015) pp. 1-3.

* cited by examiner

*Primary Examiner* — Ziaul A Chowdhury
(74) *Attorney, Agent, or Firm* — NORTON ROSE FULBRIGHT US LLP; Gerard A. Messina

(57) ABSTRACT

A method for obtaining coverage-guided fuzzing of software on a hardware target. The hardware target includes a breakpoint register, and is designed to stop an execution of the software prior to execution of an instruction of the software if the instruction is reached during the execution of the software; a memory address of the instruction is set in the breakpoint register. The method includes setting a first breakpoint prior to a first instruction of the software; executing or continuing a fuzzing iteration of the software; first checking whether the first breakpoint is reached while executing or continuing the fuzzing iteration; storing a piece of log information that includes that the first instruction in the fuzzing iteration has been reached, and optionally deleting the first breakpoint if the first check is positive. The coverage-guided fuzzing of the software includes the piece of log information.

15 Claims, 5 Drawing Sheets

COVERAGE-GUIDED FUZZING VIA DYNAMIC INSTRUMENTATION

BACKGROUND INFORMATION

Fuzzing (or fuzz testing) is an automated technique for testing software. In a plurality of fuzzing iterations, the software is executed using invalid, unexpected, and/or random input data, and is monitored for exceptions such as crashes, failed built-in code assertions, potential memory leaks, etc. For software whose input data must be present in a predetermined data structure, fuzzers that are designed for this predetermined data structure may be used. The predetermined data structure is specified in a file format and/or log, for example. An (efficient) fuzzer is designed to generate invalid, unexpected, and/or random input data in the predetermined data structure, so that an execution of a particular fuzzing iteration of the software may be started without parse error, based on the input data. By use of fuzzing, unanticipated behavior such as unexpected (program) paths and/or programming errors as well as boundary cases may be ascertained, in particular in fairly complex software (such as software for the control, regulation, and/or monitoring of a technical system). The software and in particular its security may be improved via better software understanding that is obtained in this way.

A fuzzing target may be software (a program, for example) and/or a portion thereof (a function, for example) that are/is to be tested by fuzzing. The fuzzing target may be such that it potentially accepts untrustworthy input data, which may be generated during the fuzzing by a fuzzer for a plurality of fuzzing iterations. In this context, fuzzing may be regarded as the automated process of sending arbitrary and in particular invalid, unexpected, and/or random input data to the fuzzing target and then observing its response during the execution of this fuzzing iteration. The fuzzer or the fuzzing machine is a computer program that is designed to automatedly generate input data for each fuzzing iteration for the fuzzing target. The fuzzer is not part of the fuzzing target, but, rather, is independent of the fuzzing target. Fuzzers are generally not instrumented. A conventional fuzzer is afl or libfuzzer, for example. The combination of a fuzzing target and an associated fuzzer may be referred to as a fuzzing test. The fuzzing test is executable. The fuzzer may in each case generate different input data for a plurality of fuzzing iterations, for example hundreds or thousands of fuzzing iterations per second, and may in each case start, observe, and also stop, if necessary, a fuzzing test, using the associated input data. A fuzzing iteration includes an execution of the fuzzing target/the software, starting from input data that are generated for this fuzzing iteration. By storing the particular input data, the fuzzing iteration, in particular when an unexpected behavior of the software has been recognized during the fuzzing iteration (for example, paths that are not yet known and/or programming errors), may be reproduced at a later point in time, it then being possible for the fuzzing target to be executed without a fuzzer, but instead on the stored input data.

Information from the software target may be output during the execution of a fuzzing test. Such coverage-guided fuzzing may advantageously be used in order to recognize paths/blocks that are not yet known and/or to locate programming errors in the software. Coverage-guided fuzzing may be implemented by static instrumentation of the fuzzing target, as with afl, for example. For the static instrumentation, the fuzzing target, i.e., the software, is modified (during compilation, for example) in such a way that information concerning, for example, most recently executed instructions in the software and/or (program) paths in executing the software, and in particular during a fuzzing iteration, may be retrieved. Alternatively or additionally, coverage-guided fuzzing may be obtained from a dynamic instrumentation. The execution of the software during runtime is controlled via system functionalities and/or emulators in order to obtain information concerning the sequences in the software. Coverage-guided fuzzing via dynamic instrumentation is advantageous in particular when the software is present in compiled form (closed-source software).

JinSeok Oh, Sungyu Kim, Eunji Jeong, and Soo-Mook Moon, "Os-less dynamic binary instrumentation for embedded firmware," 2015 IEEE Symposium in Low-Power and High-Speed Chips (COOL CHIPS XVIII), pages 1-3, IEEE, 2015, provide a dynamic instrumentation via debuggers and breakpoints that are based on software interrupts. The binary code of the software is actively modified, and an instruction is replaced by a software interrupt instruction.

SUMMARY

A first general aspect of the present invention relates to a computer-implemented method for obtaining coverage-guided fuzzing of software on a hardware target, the hardware target including at least one breakpoint register and being designed to stop an execution of the software, prior to execution of an instruction of the software, if the instruction is reached during the execution of the software, and a memory address of the instruction is set in the at least one breakpoint register. According to an example embodiment of the present invention, the method includes setting a first breakpoint prior to a first instruction of the software. The method further includes executing or continuing a fuzzing iteration of the software. The method further includes first checking for whether the first breakpoint is reached while executing or continuing the fuzzing iteration. The method further includes storing a first piece of log information that includes that the first instruction in the fuzzing iteration has been reached. The method may include deletion of the first breakpoint when the first check is positive. The coverage-guided fuzzing of the software includes the first piece of log information.

A second general aspect of the present invention relates to a computer system that is designed to carry out the computer-implemented method for obtaining coverage-guided fuzzing of the software on the hardware target according to the first general aspect (or a specific embodiment thereof).

A third general aspect of the present invention relates to a computer program that is designed to carry out the computer-implemented method for obtaining coverage-guided fuzzing of the software on the hardware target according to the first general aspect (or a specific embodiment thereof).

A fourth general aspect of the present invention relates to a computer-readable medium or signal that the computer program stores and/or contains according to the third general aspect (or a specific embodiment thereof).

The method provided in this disclosure according to the first aspect (or a specific embodiment thereof) is directed to obtaining coverage-guided fuzzing of software on a hardware target, in particular when the software cannot be statically instrumented per se or on the hardware target.

For computer systems such as desktop systems (PCs, etc.) and in particular for software that is present in the form of a programming code (open-source software, for example), the static instrumentation is a method for obtaining coverage-guided fuzzing during execution of the software and in particular during a fuzzing iteration of the software.

However, for software that is executed on an embedded system that is incorporated in a technical context, the static instrumentation for the fuzzing may be difficult for the following reasons: The fuzzer that is necessary for the fuzzing must typically be executed on a different computer (for example, due to lack of computing and/or storage capacity in the embedded system). As a result, coverage-guided fuzzing must first be transferred from the embedded system to the fuzzer (or to a different computer). In addition, an overall system, which in fact may include a plurality of components, must typically be tested. The software for the overall system may include third-party libraries and software components from other suppliers and/or customers. Such software components are often delivered as binary files (i.e., in compiled form (binary code)) that is modifiable, if at all, only with effort. Since such software components are no longer compiled, they can statically be instrumented only with effort. In contrast, software (or software components thereof) that is/are present as programming code may be easily statically instrumented during the compiling. However, in any case the size of the software increases due to the static instrumentation, so that, as a result of the typically limited resources, the statically instrumented software often no longer fits in the memory of the embedded system. The same applies for further functionalities by which the software for the fuzzing may be expanded.

In one alternative approach according to the present invention, the software of the embedded system may be executed in an emulator such as QEMU. The transparency and configurability of the emulator may be utilized to provide the coverage-guided fuzzing. Unfortunately, setting up such an emulator for a specific hardware target entails enormous labor input, since the functionality of the software of the embedded system is typically based on the availability of external hardware components such as sensors and/or actuators. However, if such hardware components are not present in the emulator, the software cannot be tested under the conditions for which it is actually designed. In fact, the software in this case will behave differently than in the context of the technical system that is designed for it. This may be manifested, for example, by the software likely running on other paths that have little to do with the actual intended purpose of the software. The use of an emulator is thus less suitable for the purpose of coverage-guided fuzzing.

If a debugger is connected to the embedded system, breakpoint instructions (concerning at least one hardware breakpoint register) may be utilized to stop the execution of the software in the embedded system at a targeted position in the code. However, it will not be possible to obtain approximately complete coverage-guided fuzzing via arbitrary breakpoints, since the number of simultaneously active breakpoints is normally greatly limited. For example, an ARM Cortex-M0 microcontroller is designed for a maximum of four simultaneously active hardware breakpoints.

The method provided in this disclosure according to the first aspect (or a specific embodiment thereof) is particularly suited for the fuzzing on a hardware target/embedded system, and in the (typical) case that the number of breakpoints is greatly limited. As stated above, the software, in contrast to the emulator, may be tested more realistically, and thus better, by the fuzzing on the (genuine) hardware target. For the method, it is sufficient if the hardware target allows at least one breakpoint. Starting from a function to instrument which is usually specified, due to the method provided in this disclosure and in particular by a systematic starting of instructions by successively and strategically setting at least one breakpoint, an abstract syntax tree may be ascertained and/or tried out, at least for the portion of the software that is covered by the fuzzing iteration. Individual steps during the systematic starting may be referred to as "slide." Converting (or deleting and resetting) the at least one breakpoint ensures that the maximum number of breakpoints is not exceeded at any point in time. As an alternative or in addition to the slide, the at least one breakpoint may be successively set in such a way that jumps in the syntax tree in fuzzing iterations may be tried out and/or started. By a combination of slides and jumps, very efficient search strategies may be implemented, even in unknown compiled software (closed-source software), and the software may be tried out. If unexpected behavior occurs during a fuzzing iteration, the coverage-guided fuzzing may be utilized to improve the software, and in particular its security, via a software modification. In addition, the functionality and in particular the security of the embedded system that is controlled, regulated, and/or monitored by the software may thus be improved.

A method from the related art (Oh et al., cf. above) for the dynamic instrumentation via debuggers and breakpoints based on software interrupts could, in light of the present disclosure, likewise be used for obtaining coverage-guided fuzzing of the software on the hardware target. For example, the above-described replacement of an instruction by a software interrupt instruction may be repeated multiple times, and various breakpoints may thus be set. However, the memory must be rewritten for each repetition. However, for the utilized EEPROM/flash memories in microcontrollers this results in significant overhead. Obtaining coverage-guided fuzzing of the software on the hardware target via software interrupts is thus inefficient or even impracticable.

Instead, in the method provided according to the present invention, hardware breakpoints are set (via the at least one hardware breakpoint register). It has proven to be advantageous that hardware breakpoints may be set without a large overhead. Coverage-guided fuzzing of the software on the hardware target may thus be obtained efficiently and thus quickly.

Furthermore, the method provided according to the present invention is also suitable in applications (for example, for testing/trying out existing products) in which the software is executed from a read-only memory (ROM) of the hardware target. In this case, the replacement of instructions in the binary code of the software by software interrupt instructions is possible, if at all, only with significant effort.

DETAILED DESCRIPTION OF EXAMPLE EMBODIMENTS

Method 100 provided in this disclosure allows coverage-guided fuzzing to be obtained during the fuzzing of software on a hardware target. The hardware target may be an electronic control unit, for example, and the software may be designed to control, regulate, and/or monitor the electronic control unit.

Method 100 provided in this disclosure may be particularly suitable for the case in which the software is not statically instrumented for fuzzing. In addition, the software (in whole or in part) may be closed-source software. Instead, coverage-guided fuzzing of the software may be obtained via dynamic instrumentation.

Figure 2:
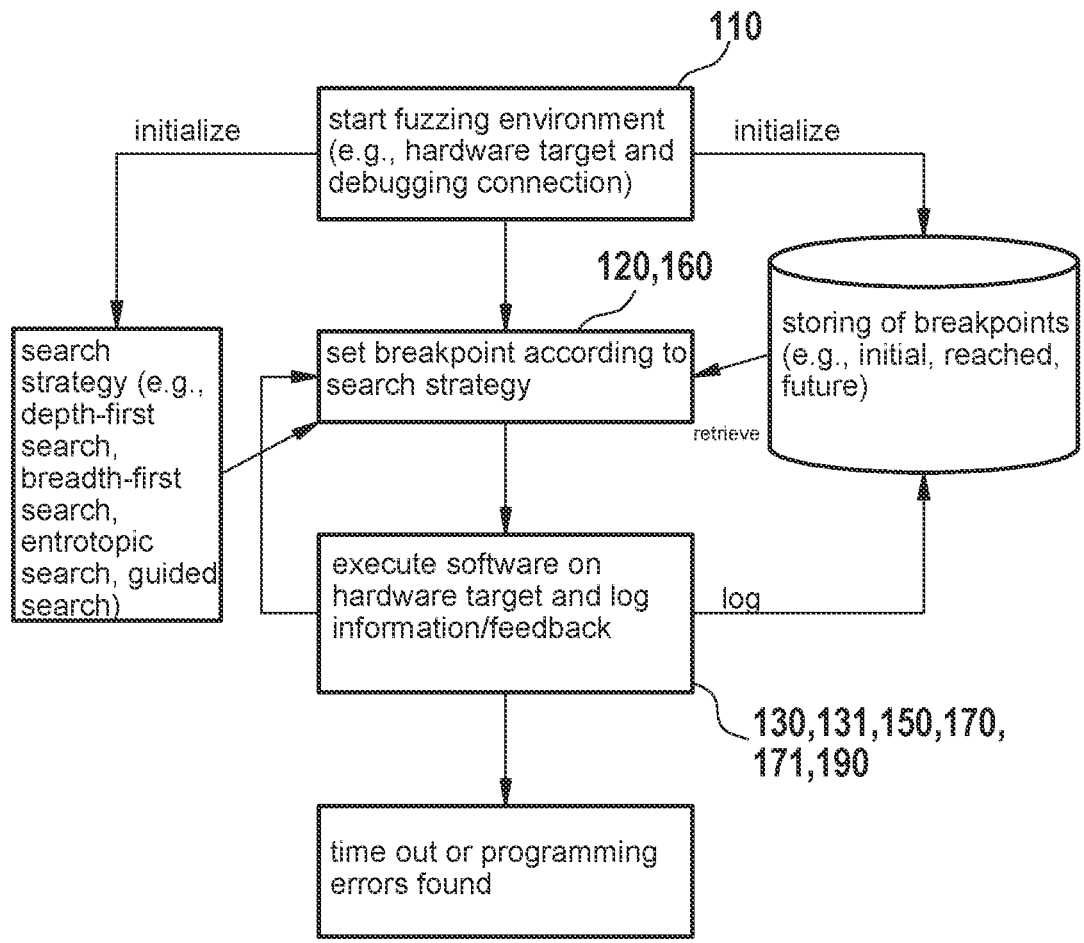
FIG. 2 schematically illustrates an example of one specific embodiment of the computer-implemented method for obtaining coverage-guided fuzzing of software on a hardware target, according to the present invention.

When there is a debugging connection to the hardware target, coverage-guided fuzzing may be obtained during the fuzzing and in particular during a fuzzing iteration, for example as described below and illustrated in FIG. 2 by way of example:

Before executing the fuzzing iteration, a first breakpoint may initially be set prior to a function to instrument. This function to instrument may be characterized in that it is carried out during the execution of the software, independently of the input data and thus for each fuzzing iteration. The function to instrument may be identified, for example, from a specification of the software (a symbol file, for example) and/or by a test engineer.

The fuzzing iteration of the software may then be executed based on the fuzzing input data for the fuzzing iteration. If the first breakpoint is reached during execution of the fuzzing iteration, it may be marked as reached. Optionally and in particular, if the maximum number of (hardware) breakpoint registers is greatly limited, the first breakpoint may be deleted.

At least one second breakpoint may then be set prior to an instruction, for example in the next branches of an abstract syntax tree (AST) 10. If the second breakpoint in turn is reached during execution of the fuzzing iteration, it may be marked as reached. Optionally and in particular, if the maximum number of breakpoint registers is greatly limited, the second breakpoint may be deleted. The fuzzing input data that have resulted in the second breakpoint being reached may be stored, and linked to the associated instruction or to an associated node in abstract syntax tree 10.

Coverage-guided fuzzing during the execution of the fuzzing iteration may be obtained by successively converting (or deleting and resetting) at least one breakpoint. The coverage-guided fuzzing may include, for example, a path in abstract syntax tree 10, it being possible for the path to include a sequence of nodes of abstract syntax tree 10. Each node of abstract syntax tree 10 may be an instruction of the software.

However, abstract syntax tree 10 of the (compiled, closed-source) software often is not known in advance. By use of method 100 provided in this disclosure, the abstract syntax tree may still be constructed with reasonable effort during the fuzzing, for example via successively recorded conditional jumps that are in the range of presently set breakpoints. For this purpose, the procedure may be a function of the hardware target. For example, conditional branch instructions may be analyzed, and their particular child nodes in abstract syntax tree 10 may thus be recognized. Alternatively or additionally, a breakpoint may be set in each case prior to a conditional branch instruction, and at least one child node may then be searched for and found.

It is possible that a set breakpoint is not reached during the execution of the fuzzing iteration. It is even possible that a set breakpoint is not reached during the execution of a plurality of fuzzing iterations. Based on a predetermined criterion (for example, if the breakpoint is not reached after a predetermined number of fuzzing iterations and/or in the event of a timeout), the breakpoint may be marked as skipped over. Prior to an instruction, this breakpoint or a new breakpoint may then be set in a branch (in abstract syntax tree 10) in the vicinity which previously has not been marked either as reached or skipped over. A branch in the vicinity may, for example, be defined as a branch that has a distance of one from a reached node in abstract syntax tree 10. In the case that only skipped breakpoints are in the vicinity, a skipped breakpoint that may still possibly be reached on new fuzzing input data may also be selected.

Figure 3A:
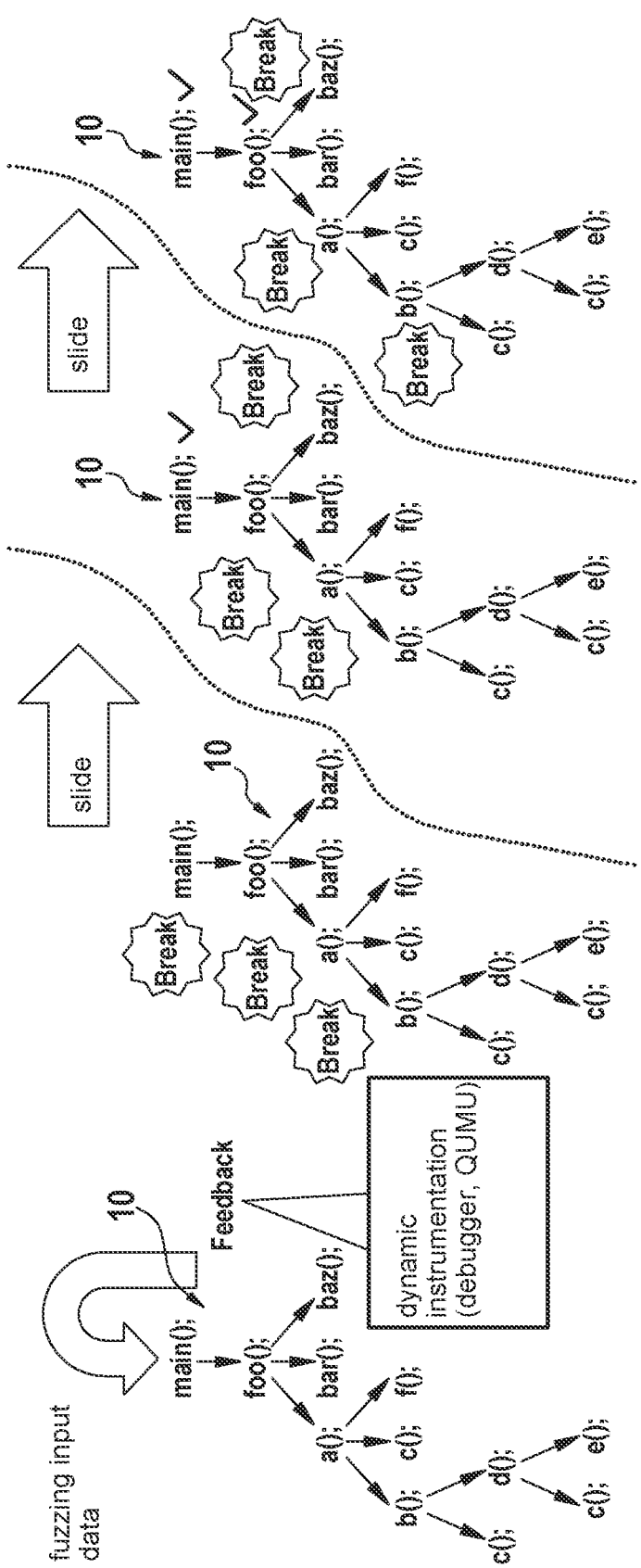
FIG. 3A shows an example of a breadth-first search in an abstract syntax tree for dynamic instrumentation including three available breakpoint registers, according to an example embodiment of the present invention.
Figure 3B:
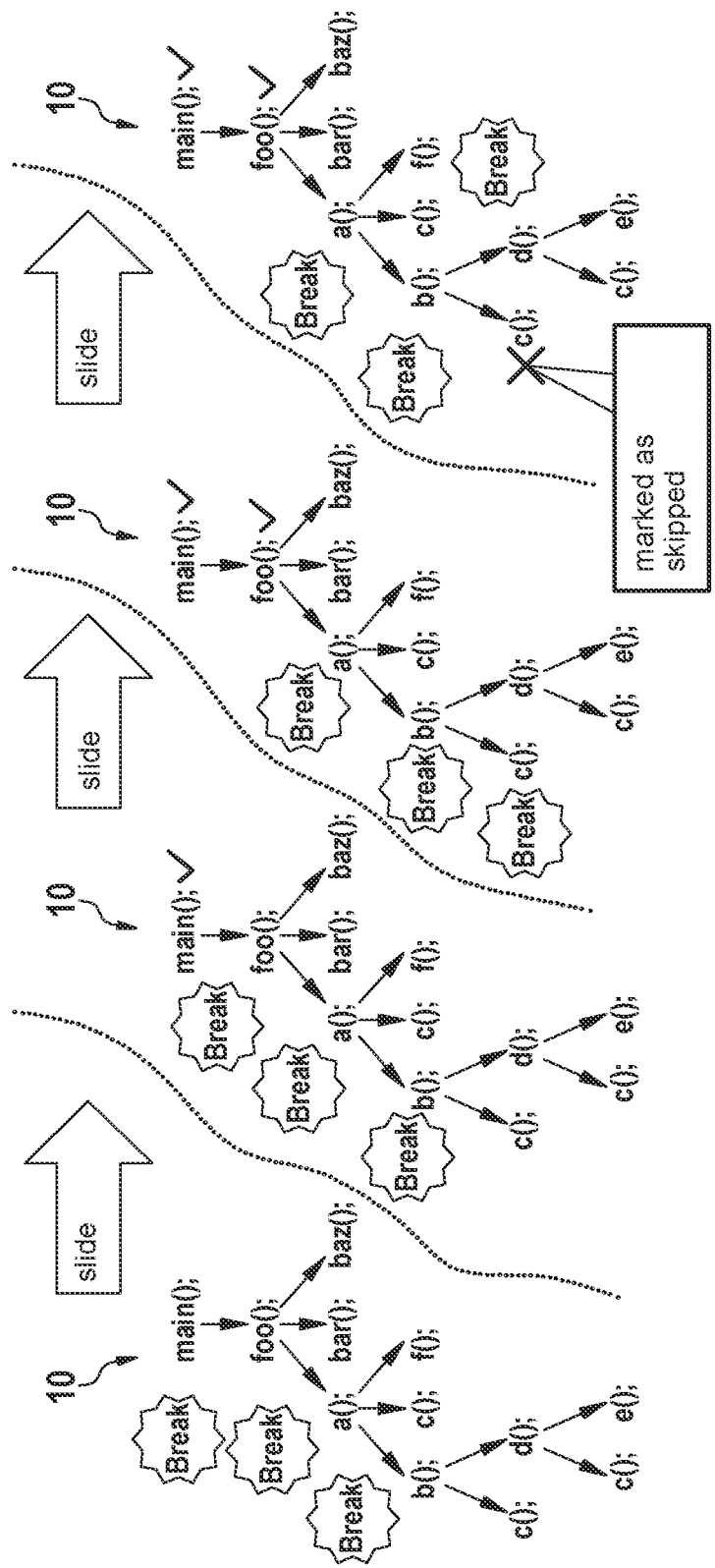
FIG. 3B shows an example of a depth-first search in an abstract syntax tree for dynamic instrumentation including three available breakpoint registers, according to an example embodiment of the present invention.

Various strategies for setting available breakpoints on the hardware target may be used in method 100. In addition, various strategies in method 100 may be combined and/or alternated. One strategy may include, for example, penetrating with the breakpoints as quickly as possible into the depth of abstract syntax tree 10. Such a depth-first search is illustrated based on an example in FIG. 3A. Alternatively or additionally, the strategy may include penetrating with the breakpoints as quickly as possible into the breadth of abstract syntax tree 10. Such a breadth-first search is illustrated based on an example in FIG. 3B. Alternatively or additionally, the strategy may include a probabilistic search. Alternatively or additionally, the strategy may include an entropic search. Alternatively or additionally, the strategy may include a guided search. Alternatively or additionally, the strategy may include further search strategies. For the entropic search, a branch (and/or a node) in abstract syntax tree 10 that are/is reached during the fuzzing are/is provided with a particular value for information gain (also entropy). The strategy for the entropic search may then include the fuzzer generating such fuzzing input data that maximize an overall information gain. Thus, branches with high information gain may be more preferred. As a result, fewer branches that are already reached are discovered. New branches may thus be discovered more efficiently. For the guided search, the setting of the particular at least one breakpoint may be based on a user input. For example, if a user, a programmer, and/or an auditor of the software are/is aware of a critical location in the software or in abstract syntax tree 10 of the software, such knowledge about a user interface may be utilized to select the breakpoints and/or fuzzing input data in such a way that the critical location for at least one fuzzing iteration is reached and thus thoroughly tested.

A computer-implemented method 100 for obtaining coverage-guided fuzzing of software on a hardware target is provided, the hardware target including at least one breakpoint register and being designed to stop an execution of the software prior to execution of an instruction of the software if the instruction is reached during the execution of the software, and a memory address of the instruction is set in the at least one breakpoint register. The at least one breakpoint register may be a hardware breakpoint register. A hardware breakpoint is a breakpoint that is set via a hardware breakpoint register.

Figure 1A:
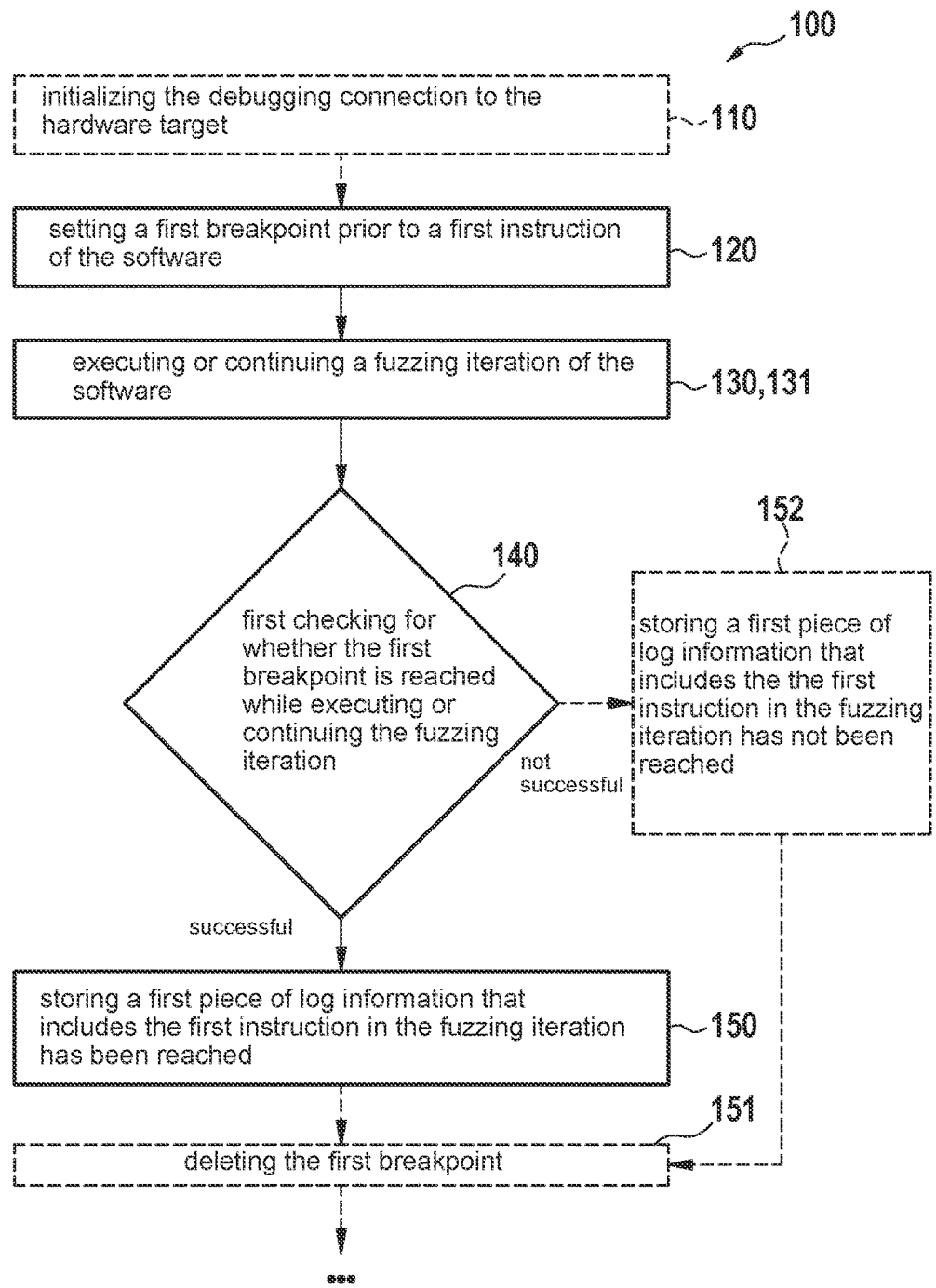
FIG. 1A schematically illustrates a computer-implemented method for obtaining coverage-guided fuzzing of software on a hardware target, according to an example embodiment of the present invention.

Method 100, schematically illustrated in FIG. 1A, includes setting 120 a first breakpoint prior to a first instruction of the software. Setting 120 the first breakpoint prior to the first instruction of the software may include setting a memory address of the first instruction in the at least one breakpoint register.

Method 100 may include executing 130 a fuzzing iteration of the software (based on fuzzing input data that are associated with the fuzzing iteration). Alternatively, method 100 may include continuing 131 an (already partially executed but stopped) fuzzing iteration of the software.

Method 100 includes first checking 140 for whether the first breakpoint is reached while executing 130 or continuing 131 the fuzzing iteration. The first breakpoint is reached if, without the first breakpoint, the first instruction would have been executed during execution of the software, based on the fuzzing input data of the fuzzing iteration.

Method 100 includes storing 150 a first piece of log information, the log information including that the first instruction in the fuzzing iteration has been reached.

Method 100 may include deleting 151 the first breakpoint if first check 140 is positive.

The coverage-guided fuzzing of the software includes the first piece of log information. The first piece of log information may also include, for example, the fuzzing input data of the fuzzing iteration.

Figure 1B:
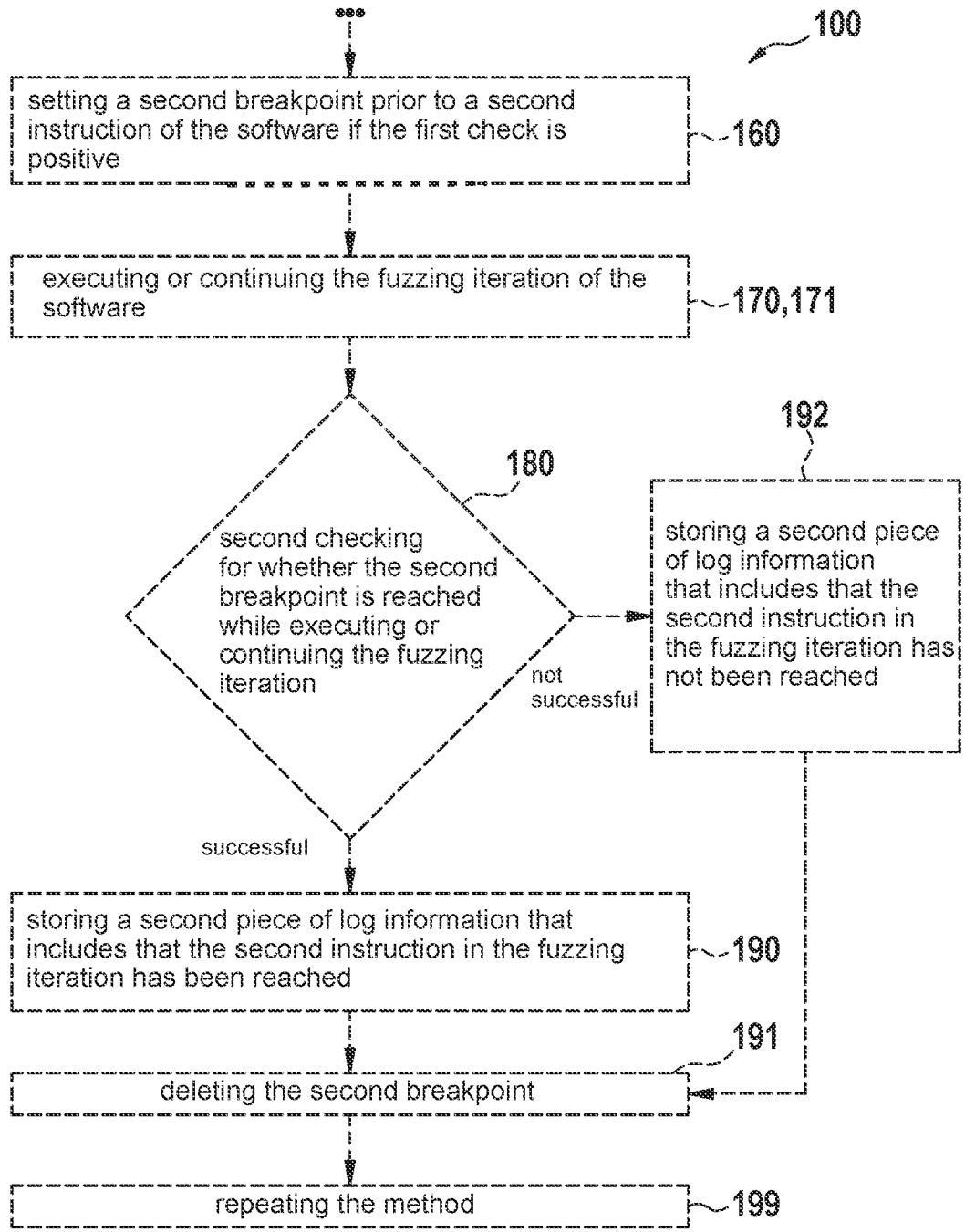
FIG. 1B schematically illustrates a continuation of the computer-implemented method for obtaining coverage-guided fuzzing of software on a hardware target, according to an example embodiment of the present invention.

Method 100, schematically illustrated in FIG. 1B (continuation from FIG. 1A), may include setting 160 a second breakpoint prior to a second instruction of the software if first check 140 is positive. Setting 160 the second breakpoint prior to the second instruction of the software may include setting a memory address of the second instruction in the at least one breakpoint register or in a further breakpoint register.

Method 100 may include executing 170 the fuzzing iteration of the software (based on fuzzing input data that are associated with the fuzzing iteration). Alternatively, method 100 may include continuing 171 the (already partially executed but stopped) fuzzing iteration of the software.

Method 100 may include second checking 180 of whether the second breakpoint is reached while executing 170 or continuing 171 the fuzzing iteration. The second breakpoint is reached if, without the second breakpoint, the second instruction would have been executed during execution of the software, based on the fuzzing input data of the fuzzing iteration.

Method 100 may include storing 190 a second piece of log information, the second piece of log information including that the second instruction in the fuzzing iteration has been reached.

Method 100 may include deleting 191 the second breakpoint if second check 180 is positive.

The coverage-guided fuzzing of the software may include the second piece of log information. The second piece of log information may, for example, also include the fuzzing input data of the fuzzing iteration.

Setting 120, 160 breakpoints may take place via a debugging connection to the hardware target. In addition, executing 130, 170 and/or continuing 131, 171 the fuzzing iteration may take place via the debugging connection to the hardware target. Method 100, as illustrated in FIG. 1A as an optional step, may include initializing 110 the debugging connection to the hardware target.

The first instruction of the software may be a predetermined function to instrument the software. Such a selection may be suitable for starting the fuzzing or at least one fuzzing iteration of the fuzzing. Alternatively, the first instruction may be any arbitrary instruction of the software (for repeating 199, for example).

Setting 160 the second breakpoint prior to the second instruction of the software may include selecting a second instruction of the software, which in an abstract syntax tree 10 of the software shares a parent node with the first instruction of the software. Such a selection of the second instruction may be utilized, for example, for a breadth-first search in abstract syntax tree 10.

Alternatively or additionally, setting 160 the second breakpoint prior to the second instruction of the software may include selecting a second instruction of the software, which in an abstract syntax tree 10 of the software is situated in a child node of the first instruction of the software. Such a selection of the second instruction may be utilized, for example, for a depth-first search in abstract syntax tree 10.

Alternatively or additionally, setting 160 the second breakpoint prior to the second instruction of the software may include selecting the next conditional jump in the software as the second instruction of the software. A conditional jump may be a jump to an instruction of the software that takes place if a condition is met. Branches in abstract syntax tree 10 may thus be effectively made. A conditional jump may be based, for example, on a programming construct in the programming code of the software, such as if-then-else, if-elseif- . . . -else, switch case, while, for, etc.

In addition, child nodes for an instruction may be identified in the abstract syntax tree. In this way, abstract syntax tree 10 may be successively constructed, even if abstract syntax tree 10 is initially unknown.

The selection of the second instruction of the software may be based on a predetermined search strategy. As stated above, the search strategy may include a depth-first search. Alternatively or additionally, the search strategy may include a breadth-first search. Alternatively or additionally, the search strategy may include a probabilistic search. Alternatively or additionally, the search strategy may include an entropic search. Alternatively or additionally, the search strategy may include a guided search.

Method 100, as illustrated in FIG. 1A as an optional step, may include storing 152 a first piece of log information, the first piece of log information including that the first instruction in the fuzzing iteration has not been reached. Method 100 may include deleting 151 the first breakpoint if first check 140 is negative, first check 140 being negative if a predetermined criterion is met. The predetermined criterion may be met, for example, if the first breakpoint is not reached after a predetermined time period or is not reached until the end of the fuzzing iteration.

Method 100, as illustrated in FIG. 1B as an optional step, may include storing 192 a second piece of log information, the second piece of log information including that the second instruction in the fuzzing iteration has not been reached. Method 100 may include deleting 191 the second breakpoint if second check 180 is negative, second check 180 being negative if a/the predetermined criterion is met. The predetermined criterion may be met, for example, if the second breakpoint is not reached after a predetermined time period or is not reached until the end of the fuzzing iteration.

The coverage-guided fuzzing of the software may include the first and/or second piece(s) of log information. The first and/or second piece(s) of log information may also include the fuzzing input data, for example.

Method 100 may include repeating 199 method 100. For example, method 100 may be repeated 199 until the execution of the fuzzing iteration and/or the fuzzing are/is ended. As a result of repeating 199, successive breakpoints may be set, and thus coverage-guided fuzzing may be obtained. Repeating 199 may begin with a new step 110. Alternatively or additionally, repeating 199 may begin with a new step 160, each consecutive numbering of breakpoints, instructions, etc., being incremented by one. New step 160 may thus be as follows: setting a third breakpoint prior to a third instruction of the software if the second check is positive, etc.

Moreover, a computer system is also provided which is designed to carry out computer-implemented method 100 for obtaining coverage-guided fuzzing of the software on the hardware target. The computer system may include a processor and/or a working memory. The computer system may be designed to communicate with the hardware target via the debugging connection. The computer system may include the fuzzer, which is designed to generate and provide fuzzing input data for at least one fuzzing iteration of the software on the hardware target.

Furthermore, a computer program is also provided which is designed to execute the computer-implemented method 100 for obtaining coverage-guided fuzzing of the software on the hardware target. The computer program may be present in interpretable form or in compiled form, for example. For the execution, the computer program (also in portions) may be loaded, for example, as a bit sequence or byte sequence in the RAM of a computer.

Moreover, a computer-readable medium or signal is also provided which stores and/or contains the computer program. The medium may include, for example, one of the following: RAM, ROM, EPROM, HDD, SDD, etc., on/in which the signal is stored.

What is claimed is:

1. A computer-implemented method for obtaining coverage-guided fuzzing of software on a hardware target, the hardware target including at least one breakpoint register and being configured to stop an execution of the software, prior to execution of an instruction of the software, when the instruction is reached during the execution of the software, and a memory address of the instruction is set in the at least one breakpoint register, the method comprising the following steps:
    setting a first breakpoint prior to a first instruction of the software;
    executing or continuing a fuzzing iteration of the software;
    first checking for whether the first breakpoint is reached while executing or continuing the fuzzing iteration; and
    storing a first piece of log information that includes that the first instruction in the fuzzing iteration has been reached, based on the first check being positive;
    wherein the coverage-guided fuzzing of the software includes the first piece of log information.

2. The method as recited in claim 1, further comprising deleting the first breakpoint when the first check is positive.

3. The method as recited in claim 1, further comprising:
    setting a second breakpoint prior to a second instruction of the software when the first check is positive;
    executing or continuing the fuzzing iteration of the software;
    second checking for whether the second breakpoint is reached while executing or continuing the fuzzing iteration;
    storing a second piece of log information that includes that the second instruction in the fuzzing iteration has been reached;
    wherein the coverage-guided fuzzing of the software includes the second piece of log information.

4. The method as recited in claim 3, further comprising deleting the second breakpoint when the second check is positive.

5. The method as recited in claim 3, wherein the setting of the second breakpoint prior to the second instruction of the software includes selecting a second instruction of the software, which in an abstract syntax tree of the software shares a parent node with the first instruction of the software.

6. The method as recited in claim 3, wherein the setting of the second breakpoint prior to the second instruction of the software includes selecting a second instruction of the software, which in an abstract syntax tree of the software is situated in a child node of the first instruction of the software.

7. The method as recited in claim 3, wherein the setting of the second breakpoint prior to the second instruction of the software includes selecting a next conditional jump in the software as the second instruction of the software.

8. The method as recited in claim 3, wherein the selection of the second instruction of the software is based on a predetermined search strategy.

9. The method as recited in claim 1, wherein the first instruction of the software is a predetermined function to instrument the software.

10. The method as recited in claim 1, wherein the software is not statically instrumented for fuzzing and/or is a closed-source software.

11. The method as recited in claim 1, wherein the hardware target is an electronic control unit, and the software is configured to control the electronic control unit and/or regulate the electronic control unit, and/or monitor the electronic control unit.

12. The method as recited in claim 1, further comprising:
    storing the first piece of log information that includes that the first instruction in the fuzzing iteration has not been reached based on the first check being negative, the first check being negative when the first breakpoint is not reached after a predetermined time period or is not reached until an end of the fuzzing iteration; and/or
    storing a second piece of log information that includes that the second instruction in the fuzzing iteration has not been reached, based on the second check being negative, the second check being negative when the second breakpoint is not reached after a predetermined time period or is not reached until the end of the fuzzing iteration;
    wherein the coverage-guided fuzzing of the software includes the first and/or second pieces of log information.

13. The method as recited in claim 1, further comprising: repeating the steps of the method.

14. A computer system configured to obtain coverage-guided fuzzing of software on a hardware target, the computer system comprising a central processing unit (CPU), the hardware target including at least one breakpoint register and being configured to stop an execution of the software, prior to execution of an instruction of the software, when the instruction is reached during the execution of the software, and a memory address of the instruction is set in the at least one breakpoint register, the computer system configured to:
    set a first breakpoint prior to a first instruction of the software;
    execute or continue a fuzzing iteration of the software;
    perform a first check for whether the first breakpoint is reached while executing or continuing the fuzzing iteration; and store a first piece of log information that includes that the first instruction in the fuzzing iteration has been reached, based on the first check being positive;

wherein the coverage-guided fuzzing of the software includes the first piece of log information.

15. A non-transitory computer-readable medium on which is stored a computer program for obtaining coverage-guided fuzzing of software on a hardware target, the hardware target including at least one breakpoint register and being configured to stop an execution of the software, prior to execution of an instruction of the software, when the instruction is reached during the execution of the software, and a memory address of the instruction is set in the at least one breakpoint register, the computer program, when executed by a computer, causing the computer to perform the following steps:

setting a first breakpoint prior to a first instruction of the software;

executing or continuing a fuzzing iteration of the software;

first checking for whether the first breakpoint is reached while executing or continuing the fuzzing iteration; and storing a first piece of log information that includes that the first instruction in the fuzzing iteration has been reached, based on the first check being positive;

wherein the coverage-guided fuzzing of the software includes the first piece of log information.

* * * * *